United States Patent [19]

Uchiyama et al.

[11] Patent Number: 4,937,738
[45] Date of Patent: Jun. 26, 1990

[54] DATA PROCESSING SYSTEM WHICH SELECTIVELY BYPASSES A CACHE MEMORY IN FETCHING INFORMATION BASED UPON BIT INFORMATION OF AN INSTRUCTION

[75] Inventors: Kunio Uchiyama, Hachioji; Atsushi Hasegawa, Koganei; Takeshi Aimoto, Matsudo; Tadahiko Nishimukai, Sagamihara, all of Japan

[73] Assignees: Hitachi, Ltd.; Hitachi Microcomputer, both of Tokyo, Japan

[21] Appl. No.: 768,572

[22] Filed: Aug. 23, 1985

[30] Foreign Application Priority Data

Aug. 31, 1984 [JP] Japan .................. 59-180434

[51] Int. Cl.⁵ ............................................ G06I 12/02
[52] U.S. Cl. .................... 364/200; 364/243.41; 364/243.43; 364/254.8; 364/261.1
[58] Field of Search ... 364/200 MS File, 900 MS File; 365/189

[56] References Cited

U.S. PATENT DOCUMENTS

| | | | |
|---|---|---|---|
| 4,075,686 | 2/1978 | Calle et al. | 364/200 |
| 4,189,770 | 2/1980 | Gannon et al. | 364/200 |
| 4,219,883 | 8/1980 | Kobayashi et al. | 365/189 |
| 4,298,929 | 11/1981 | Capozzi | 364/200 |
| 4,338,663 | 7/1982 | Strecker et al. | 364/200 |
| 4,357,656 | 11/1982 | Saltz et al. | 364/200 |
| 4,382,278 | 5/1983 | Appelt | 364/200 |
| 4,398,243 | 8/1983 | Holberger et al. | 364/200 |
| 4,500,954 | 2/1985 | Duke et al. | 364/200 |
| 4,530,049 | 7/1985 | Zee | 364/200 |
| 4,597,044 | 6/1986 | Circello | 364/200 |
| 4,626,988 | 12/1966 | George | 364/900 |
| 4,635,194 | 1/1987 | Burger et al. | 364/200 |
| 4,669,043 | 5/1987 | Kaplinsky | 364/200 |
| 4,719,568 | 1/1988 | Carrubba et al. | 364/200 |

FOREIGN PATENT DOCUMENTS

56-143583 9/1981 Japan .
57-114950 7/1982 Japan .

OTHER PUBLICATIONS

Tang, "Cache System Design in the Tightly Coupled Multiprocessor System", National Computer Conference, 1976, pp. 749-753.
Beck et al., "A 32 Bit Microprocessor with On-Chip Virtual Memory Management", 1984 IEEE International Solid State Circuit Conference, pp. 178-179.
Supnik et al., "MicroVAX 32-A VAX-Compatible Microprocessor", Digest of Papers COMPCON Spring, 1984, Twenty-Eighth IEEE Computer Society International Conference, pp. 247-250.
Stevenson, "Z8000 32-Bit Microprocessor", Digest of Papers COMPCON Spring, 1984, Twenty-Eighth IEEE Computer Society International Conference, pp. 230-236.
Hill et al., "Experimental Evaluation of On-Chip Microprocessor Cache Memories", 11th Annual International Symposium on Computer Architecture Conference Proceedings, Jun. 1984, pp. 158-166.

*Primary Examiner*—Thomas C. Lee
*Attorney, Agent, or Firm*—Antonelli, Terry, Stout & Kraus

[57] ABSTRACT

A cache memory contained in a processor features a high efficiency in spite of its small capacity.

In the cache memory control circuit, it is detected whether the access operation of the processor is directed to a particular region of the memory, and when the data is to be read out from, or is to be written onto, the particular region, the data is copied onto the cache memory and when the data is to be read out from other regions, operation of the memory is executed immediately without waiting for the reference of cache memory.

By assigning the particular region for the data that is to be used repeatedly, it is possible to provide a cache memory having good efficiency in spite of its small capacity. A representative example of such data is the data in a stack.

9 Claims, 2 Drawing Sheets

FIG. 2
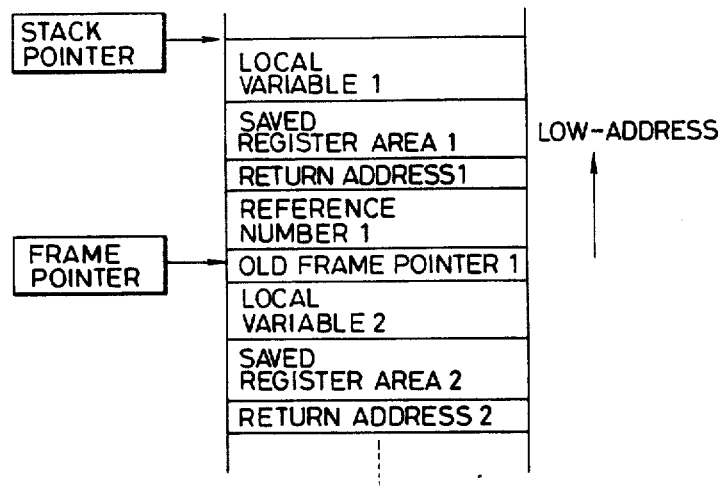
FIG. 3(a)
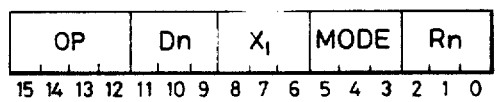
| OP | Dn | X₁ | MODE | Rn |
15 14 13 12 | 11 10 9 | 8 7 6 | 5 4 3 | 2 1 0
FIG. 3(b)
| BIT 5~3 | MODE |
|---|---|
| 0 0 0 | DATA REGISTER |
| 0 0 1 | ADDRESS REGISTER |
| 0 1 0 | ADDRESS REGISTER INDIRECT |
| 0 1 1 | POST INCREMENT |
| 1 0 0 | PRE DECREMENT |
| 1 0 1 | ADDRESS REGISTER INDIRECT WITH DISPLACEMENT |
| 1 1 0 | PROGRAM COUNTER INDIRECT WITH DISPLACEMENT |
| 1 1 1 | ABSOLUTE ADDRESS |

DATA PROCESSING SYSTEM WHICH SELECTIVELY BYPASSES A CACHE MEMORY IN FETCHING INFORMATION BASED UPON BIT INFORMATION OF AN INSTRUCTION

BACKGROUND OF THE INVENTION

The present invention relates to a cache memory control circuit.

A cache memory works to reduce the time required for obtaining data, and is widely employed as means to enhance performance of a processor. A computer employing a cache memory has been disclosed, for example, in "AFIPS", Vol. 45, pp. 749, 1976.

In recent years, a cache memory has been employed even in microprocessors, and when required data has not been contained in the cache memory, the data or a data block containing the data must be fetched from the main memory. The fetching, however, is carried out requiring ordinary fetching time as well as reference time to determine whether the data is contained in the cache memory or not. Therefore, if the probability (hereinafter referred to as hit rate) in which the necessary data exists in the cache memory is low, it becomes difficult to enhance the performance of the system as expected, but rather the retrieval time turns out to be overhead and, in extreme cases, performance is often deteriorated. As for instructions, in general, the same instruction is in many cases accessed many times since data is usually localized in a relatively small area. Therefore, a high hit ratio may be obtained even with the cache memory of a relatively small capacity. In the case of an operand, however, the locality is relatively weak, so that a high hit ratio is not effectively obtained unless the cache memory has a capacity which is relatively large. For this reason, even a minicomputer is usually provided with a cache memory having a capacity of about four kilobytes.

However, in a very small processor such as a microprocessor, the time for sending and receiving data relative to an external unit is considerably longer than the time for effecting such operations in the chip. Therefore, it has been strongly desired to form a cache memory in the same chip as the CPU. With the current integration degree of LSIs, however, it is difficult to form a cache memory of a large capacity on the same chip as the CPU. At present, therefore, the capacity of about 500 bytes is a limit, Therefore, a contrivance is necessary to obtain a high hit rate even with the cache memory of a small capacity.

SUMMARY OF THE INVENTION

The object of the present invention is to provide a cache memory which exhibits a high hit rate and an increased efficiency in spite of its small capacity, to make it possible to enjoy the advantage of a cache memory even with a very small processor.

The present invention is designed to utilize the cache memory only for that data which is to be utilized repeatedly. With the cache memory control circuit of the present invention, it can be determined whether memory access is directed to a particular region or not, as well as when the data is to be read out or written to the particular region depending upon the result of detection, the subject data is copied onto the cache memory, and when the data is to be read out from other regions, that data is immediately read out from the memory without waiting for the reference of cache memory.

By assigning the particular region for the data that is to be repeatedly used at a high percentage, it is possible to obtain a cache memory having good efficiency in spite of its small capacity. A representative example of such data is data in a "stack" in the memory.

BRIEF DESCRIPTION OF THE DRAWINGS

FIG. 2 is a diagram which schematically illustrates a stack;

FIG. 3(a) is a am showing an instruction format of the embodiment of FIG. 1 in relation to the access modes; and FIG. 3(b) is a diagram showing the correspondence between bit patterns and addressing modes.

DESCRIPTION OF THE PREFERRED EMBODIMENT

Figure 1:
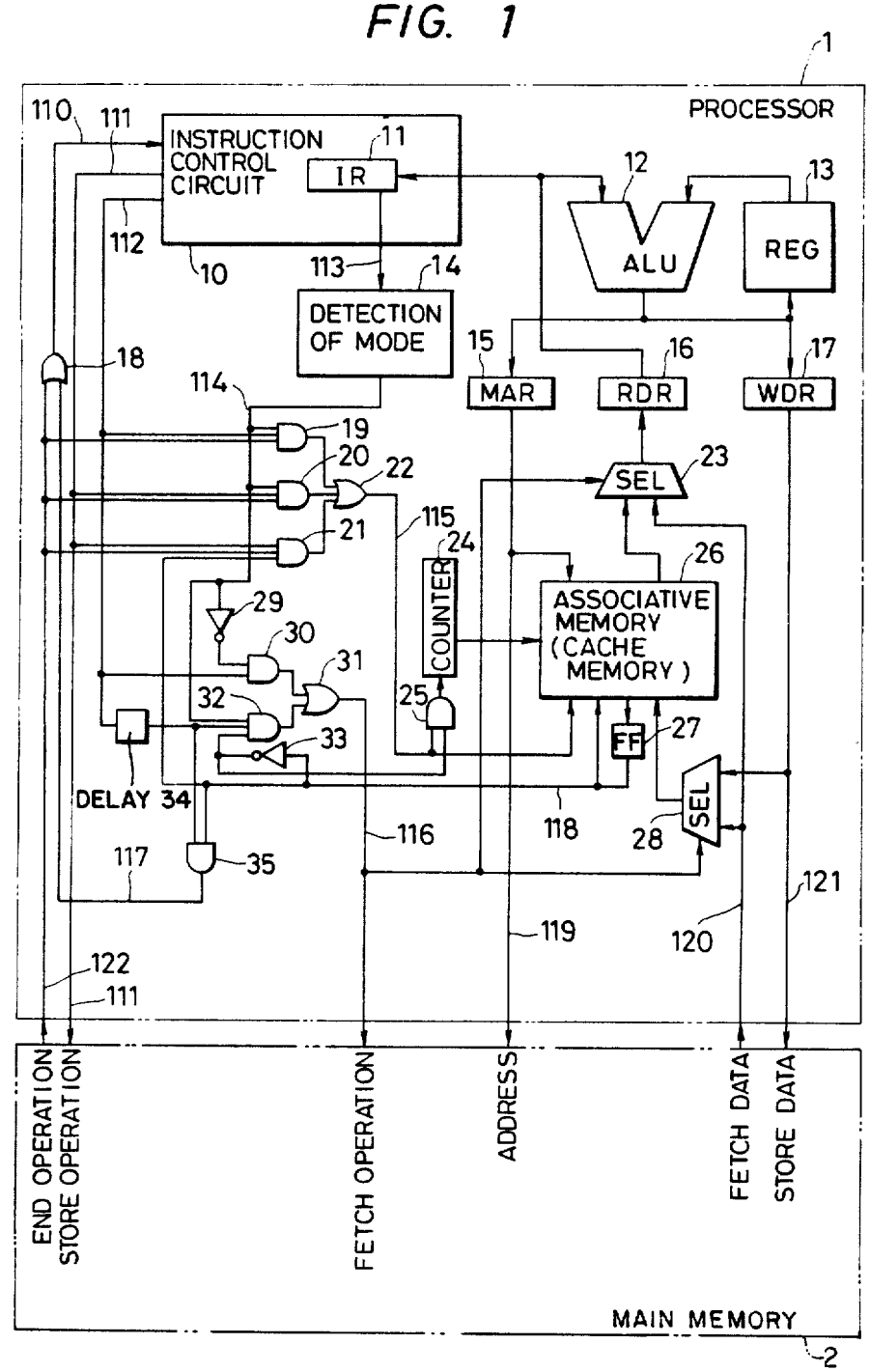
FIG. 1 is a block diagram showing an embodiment of the present invention.

A preferred embodiment of the present invention will be described below.

Instruction for the control apparatus of the embodiment will first be described below and the apparatus will be described thereafter.

(1) Description of Instructions.

(i) Instruction format.

FIG. 3(a) shows an instruction format for this processor. The instruction consists fundamentally of an operation word for designating a kind of operation, a register to be used, and an addressing mode or the like, and an expansion portion X which gives data for address calculation. Depending upon the kind of addressing mode designated, however, the instruction format is often not provided with an expansion portion. Bits, 11 to 9 of the operation word represent the number of the data register that holds data used as an operand for an arithmetic operation. Another operand is designated by bits 5 to 0 of the operation word. That is, bits 2 to 0 represent the number of a register to which reference will be made to obtain the operand. As will be described later, the processor contains 16 registers. Among them, there are eight data registers to store the operands, and there are eight other address registers to store addresses of operands in the memory device. These registers are designated by instruction to obtain operands. Bits 5 to 3 represent addressing modes.

FIG. 3(b) shows the correspondence between bit patterns of bits 5 to 3 and addressing modes. In FIG. 3(b), the "data register" mode and the "address register" mode are those in which contents of the designated data register and address register serve as operands.

The "address register indirect" mode is the one in which content of a designated address, register is used as a memory address of an operand in, the memory device. The "post-increment" mode and the "pre-decrement" mode are fundamentally the same as the "address register indirect" mode, but differ in that they set the contents of the address registers to +1 and −1, respectively, just after and immediately before the operand is stored or fetched.

The "address register indirect with displacement" mode is the one in which a value obtained by adding the content of an expansion portion to the content of the designated address register, is used as a memory address of an operand, and the "program counter relation with displacement" mode is the one in which a value obtained by adding the content of an expansion portion to the address (content of the program counter) of the instruction, is used as a memory address of an operand. The "absolute address" mode is the one in which the content of the expansion portion is directly used as a memory address of an operand.

(ii) Stack access mode.

The stack access mode will be described below.

Most programs are written in a high-level language, and have a tack as its data structure. When a subroutine is used, in particular, variables used in the main routine and variables in the subroutine are stored in the stack as separate masses. Such masses are called frames which are provided for each of the routines.

In the case of a small processor, in particular, the stack is realized by the combination of a portion of the main memory, a stack pointer and a frame pointer. That is, the content of the stack pointer is renewed successively, and the variable is successively stored in the main memory using the content of the stack pointer as an address of the main memory.

When a subroutine is to be called from the main routine, the frame corresponding to the main routine must be switched to the frame corresponding to the subroutine. For this purpose, the content of the stack pointer used in the main routine is copied onto the frame pointer. Further, the content of the frame pointer up to that moment is stored at an address position on the main memory designated by he present frame pointer.

FIG. 2 shows the construction of such a stack which stores a local variable 1 used for each subroutine when the procedure is to be executed, a saved register value (register shunting area 1 for restoration at the outlet of the procedure, a return address from the procedure, a reference number 1 for each procedure, and the value of the frame pointer (old frame pointer 1) at the time of starting the execution of procedure, in the order mentioned from the top of the stack on the main memory. The stack pointer designates the address of the top (head) of the stack, and the frame pointer designates the address where the value of the old frame pointer is stored. In the stack holding such data, the probability of access is high, as is that of repeated access.

Access to the stack designates the frame pointer or the stack pointer, and is executed using any one of "address register indirect", "post-increment", "pre-decrement", or "address register indirect with displacement" as an addressing mode. These modes of access to the stack are generally called stack access modes.

In this processor, two address registers are assigned to the frame pointer and to the stack pointer, respectively, among eight address registers. That is, the frame pointer is designated by setting bits 2 to 0 of instruction format of FIG. 3(a) to "110". Further, the stack pointer is designated by setting bits 2 to 0 to "111". In the stack access mode, therefore, the low-order 6 bits of the operation word assume any one of "010110", "010111", "011110", "011111", "100110", "100111", "101110", or "101111".

(2) Description of the Apparatus

Construction of the apparatus will be described below in detail.

FIG. 1 shows an embodiment of the present invention which utilizes a cache memory to access the stacked region. A command operation circuit 10 contains a register (IR) 11 for holding the operation word, decodes the instruction, and supplies a control signal to a processor 1 as well as to an external unit. A register group 13 consists of a set of the aforementioned eight data registers and eight address registers. One of the address registers is a frame pointer, and another one is a stack pointer. Operation of data for the operand and address calculation are executed by an arithmetic unit (ALU) 12, and the operated data is stored in a designated register in the register group 13, and the address value is stored in a memory address register (MAR) 15. A detection of mode decoder 14 decodes the low-order 6 bits 113 of the register (IR) 11, and renders a signal 114 ON if the stack access mode has been designated (i.e., if they pertain to any one of the aforementioned eight bit patterns). An associative memory 26 is used as the cache memory, and is referenced with the address as an index. If the data of the address is being held, the associative memory 26 sets the flip-flop 27 to render a signal 118 ON. Reference numeral 111 denotes a store operation signal, 116 denotes a fetch operation signal, 119 denotes an address value, 120 denotes fetched data, 121 denotes data to be stored, and 122 denotes the end signal of the operation of the, main memory. These signals extend to or from a memory 2. The fetched data and instructions are temporarily stored in a read data register (RDR) 16, and the data to be stored is held in a write data register (WDR) 17. A selector 23 selects either the output of the associative memory 26 or fetched data 120 from memory 2. as the data to be stored in the RDR 16, and a selector 28 selects either fetched data 120 from the memory or stores data 121 thereto as the data to be written onto the associative memory 26. A counter 24 designates an entry position for writing onto the associative memory 26. The AND gates 19 to 21 and an OR gate 22 constitute a logic circuit for generating a cache write direction signal 115, while inverters 29, 33, delay circuit 115, AND gates 30, 32 and OR gate 31 constitute a logic circuit for generating a fetch operation signal 116. Functions of the AND gates 25, 35, and of the OR gate 18 will be described later together with the operation of the whole apparatus.

The processor 1 is constructed as described above and is formed on a chip.

Operation of the apparatus will be described below with reference to the cases where the data is to be fetched in the stack access mode, where the data is to be fetched in a mode other than the stack access mode, where the data is to be stored in the stack access mode, and where the data is to be stored in a mode other than the stack access mode. In the following description, it should be presumed that the operation word of each instruction is set to register 11.

(i) Fetch in the stack access mode.

When the operand is to be fetched, the operand address is calculated by the ALU 12, set into the MAR 15, and is produced as a signal 119. Then, the command operation circuit 10 turns the internal fetch direction signal 112 ON to start the fetch. The operand address (signal 119) has been input to the associative memory 26. If there is the data of a corresponding address as a result of reference based upon the address value, the flip-flop 27 is latched to "1". If there exists no data, the flip-flop 27 is latched to "0". In the stack access mode, output signal 114 of the decoder 14 is ON, so that the AND gate 30 is not turned ON. Therefore, the fetch operation signal 116 is rendered ON only when the AND gate 32 is turned ON. The delay circuit 34 works to delay the signal 112 until reference of the associative memory 26 is finished.

When the corresponding data exists in the associative memory 26, the signal 118 is rendered ON, but the AND gate 32 is not turned ON. Therefore, the signal 116 remains OFF. Namely, the memory does not perform a fetch. When the signal 116 is OFF, the selector 23 sends the data read from the associative memory 26 to the RDR 16. The signal 110 is rendered ON by the function of AND gate 35 and OR gate 18, and the completion of the fetch is reported to the command operation circuit 10 which latches the data to the RDR 16 to complete the fetch. Namely, in this case, only the reading of data is fetched from the associative memory 26.

When the corresponding data does not exist in the associative memory 26, the signal 118 is rendered OFF. Therefore, after being delayed by the delay circuit 34, the AND gate 32 is turned ON, and the fetch operation signal 116 is rendered ON. As the signal 116 is rendered ON, the memory 2 reads the address indicated by signal 119, produces a signal 120, and then renders the signal 122 ON. As the signal 122 is rendered ON, the signal 110 is rendered ON via OR gate 18, and the completion of the fetch is reported to the command operation circuit 10. The command operation circuit 10 works to latch the data to the RDR 16. At, this moment, however, since the signal 116 is, ON, the selector 23 selects the signal 120; i.e., the data 120 read from the memory 2 is latched to the RDR 16. As the signal 122 is rendered ON, output of the AND gate 19 is rendered ON since the operation is in the stack access mode, i.e., since the signal 114 is ON. Therefore, the cache write direction signal 115 is rendered ON via OR gate 22, and write operation is instructed to the associative memory 26 which is receiving the signal 120 (output of memory) as write data that is switched by signal 116 via the selector 28. If the write operation is instructed with the signal 118 being OFF, address (signal 119) and data (signal 120) are written into the entry of the associative memory 26 indicated by the counter 24. The value of counter 24 is counted up since the output of AND gate 25, is rendered ON by the signal 115 and by the output of inverter 33. Thus, when the corresponding data does not exist in the associative memory 26 with the fetch being effected in the stack access mode, the data and address read from the memory 2, are written onto the associative memory 26.

(ii) Fetch in a mode other than the stack access mode.

When the fetch is to be effected in a mode other than the stack access mode, the signal 114 is rendered OFF. Therefore, as the signal 112 is rendered ON, fetch operation signal 116 is turned ON readily via AND gate 30 and OR gate 31, and the memory 2 initiates the read operation. When the operation for reading data from memory 2 is completed, the signal 122 is rendered ON, and the completion of fetch is reported to the command operation control circuit 10 via OR gate 18 and signal 110. The data 120 read from the memory 2 is latched to the RSR 16 via selector 23 which is switched by signal 116. In this case, however, since the, signal 114 is OFF, the signal 115 is not rendered ON and the data is not written into the associative memory 26. That is, the fetch operation in the mode other than the stack access mode is readily performed for the memory 2 without regard to the associative memory 26.

(iii) Store in the stack access mode.

Described below is the operation when the data is to be stored in the stack access mode. When the data is to be stored, the operation command circuit 10, first, sets a store address to MAR 15, sets the data to be stored to WDR 17, and then renders the signal 111 ON to start the store operation. As the signal 111 is turned ON, the memory 2 writes the data ON signal 121 into the address indicated by signal 119. In parallel with this, the associative memory 26 is referenced and the hit result is produced as signal 118. When the operation for writing data is finished, the memory 2 renders the signal 122 ON to indicate the completion of operation. At this moment, the signal 114 is ON and the store operation signal 111 is ON, too. Therefore, if the signal 122 is turned ON, output of the AND gate 20 is turned ON, the signal 115 is turned ON via OR gate 22, and writing of data into the associative memory 26 is directed.

Here, when the associative memory 26 contains no address that is in agreement with the write address, the signal 118 is off and both the address and the data are written into the entry indicated by the counter 24 of associative memory 26. On the other hand, when the associative memory 26 contains an address that is in agreement with the write address, the hit signal 118 is rendered ON, and only the data is written into the corresponding entry of the associative memory 26. Thus, when the data is to be stored in the stack access mode, the data stored in the memory is necessarily written into the associative memory 26. When the associative memory 26 does not contain room any more, the data which is regarded to be least necessary is discarded and a new data is written therein as in the conventional cache memory.

(iv) Store in a mode other than the stack access mode.

Operation for storing data in a mode other than the stack access mode is the same as the operation for storing data in the stack access mode, except for the below-mentioned points. That is, in the case of a mode other than the tack access mode, the signal 114 is OFF. Therefore, output of the AND gate 20 is not turned ON even when the finish of operation notice signal 122 is turned ON. When the signal 118 is ON, i.e., when the associative memory 26 contains an address that is in agreement with the store address, however, the signal 115 is turned ON via AND, gate 21 and OR gate 22, and writing of only data into the associative memory 26 is directed. This helps maintain the data held by the associative memory 26 to be in agreement with the data of a corresponding address in the main memory 2.

According to this embodiment as described above, the cache memory is utilized for only those stacks from which the data written thereon is to be read out again immediately, or from which the data once read is to be read out again immediately. Compared with an ordinary cache system which utilizes cache memory for all data that is to be accessed, therefore, a high hit ratio can be obtained even with a cache memory having a small capacity.

The present embodiment deals with a system in which only that data which is to be immediately accessed is copied into the cache memory. The invention, however, can also be adapted even to a system in which the data is copied with the block as a unit.

The above-mentioned embodiment has dealt with the case where the processor 1 is directly connected to the memory 2. Here, however, an address conversion mechanism may be provided between the processor 1 and the memory 2.

As described above, the processor 1 is formed in a single chip, and the address produced in the chip is supplied to the external main memory. In some of the currently proposed systems, however, the address produced, in the chip may differ from the address put to the memory 2 outside the chip, and the address, produced in the chip is often called the logical address, and the address put to the memory 2 outside the chip is often called a physical address. In general, mapping between the logical address and the physical address is performed by providing a particular hardware called an address mapping mechanism. Such a mapping mechanism has been widely known, and people skilled in the art may easily adopt it for the present invention.

With the present invention, the cache memory is utilized for only that data which is utilized at an increased frequency. Therefore, it is possible to obtain a cache memory which exhibits a high hit ratio and a high efficiency in spite of its small capacity, and to enjoy the advantage of a cache memory even with a very small processor. A high performance microprocessor can be realized with a small chip.

What is claimed is:

1. A data processing system comprising:
   a main memory for storing data;
   a microprocessor coupled to said main memory and including a cache memory, the cache memory having a capacity smaller than that of said main memory and operating at a speed faster than that of said main memory, said cache memory being accessed by receipt of addresses and holding a copy of a part of said data stored at locations corresponding to said addresses in said main memory;
   wherein said microprocessor further includes a frame pointer for designating an address of a current frame which is accessed during execution of a subroutine, said current frame being in a stack of said data stored in said main memory, and a stack pointer for designating an address of the top of said stack;
   wherein instructions are stored in said main memory and executed by said microprocessor, at least some instructions for said microprocessor include bit information which designates whether said instruction calls or does not call for accessing a stack area designated by said frame pointer and said stack pointer;
   wherein said microprocessor further includes:
   (1) first means for detecting said bit information in an instruction; and
   (2) second means for accessing said cache memory to read out said copy of said part of said data from said cache memory before accessing said main memory in response to a detection result of said first means in case said bit information designates that said instruction calls for accessing said stack area; and
   wherein said second means accesses said main memory to read out a part of said data from said main memory without regard to said cache memory in response to another detection result of said first means in case said bit information designates that said instruction does not call for accessing said stack area.

2. A data processing system according to claim 3, wherein said cache memory is formed on a single chip of said microprocessor.

3. A data processing system according to claim 4, wherein said main memory is disposed outside said microprocessor.

4. A microprocessor for use with a main memory in a data processing system, said microprocessor comprising:
   a cache memory, the cache memory having a capacity smaller than that of said main memory and operating at a speed faster than that of said main memory, said cache memory being accessed by receipt of addresses and holding a copy of a part of data stored at locations corresponding to said addresses in said main memory;
   a frame pointer for designating an address of a current frame which is accessed during a subroutine's execution, said current frame being in a stack of said data stored in said main memory; and
   a stack pointer for designating an address of the top of said stack;
   wherein instructions are stored in said main memory and executed by said microprocessor, at least some instructions for said microprocessor include bit information which designates whether said instruction calls or does not call for accessing a stack area designated by said frame pointer and said stack pointer; and
   wherein said microprocessor further includes:
   (1) first means for detecting said bit information in an instruction; and
   (2) second means coupled to said cache memory for accessing said cache memory to read out said copy of said part of said data from said cache memory before accessing said main memory for said data in response to a detection result of said first means in case said bit information designates that said instruction calls for accessing said stack area; and
   wherein said second means accesses said main memory to read out data from said main memory without regard to said cache memory in response to another detection result of said first means in case said bit information designates that said instruction does not call for accessing said stack area.

5. A microprocessor according to claim 4, wherein said cache memory is formed ON a single chip of said microprocessor.

6. A microprocessor for use with a main memory in a data processing system, said microprocessor comprising:
   a cache memory, the cache memory having a capacity smaller than that of said main memory and an operating speed faster than that of said main memory, said cache memory being accessed by receipt of addresses and holding a copy of a part of data stored at locations corresponding to said addresses in said main memory;
   wherein instructions stored in said main memory are accessed and executed by said microprocessor, and at least some instructions for said microprocessor include bit information which designates whether the instruction including said bit information accesses or does not access a stack in said main memory for storing information for a subroutine, said stack being repeatedly accessed at a high probability rate;
   wherein said microprocessor further includes:
   (1) first means for detecting said bit information in an instruction; and
   (2) second means coupled to said cache memory for accessing said cache memory to read out said copy of said part of said data from said cache memory before accessing said main memory for said data in response to a detection result of said first means in case said bit information designates that said instruction calls for accessing said stack area; and wherein said second means accesses said main memory to read out data from said main memory without regard to said cache memory in response to another detection result of said first means in case said bit information designates that said instruction does not call for accessing said stack area.

7. A microprocessor according to claim 6, wherein said cache memory is formed on a single chip of said microprocessor.

8. A microprocessor for use with a main memory in a data processing system, said microprocessor comprising:

a cache memory, the cache memory having a capacity smaller than that of said main memory and an operating speed faster than that of said main memory, said cache memory being accessed by receipt of addresses and holding a copy of a part of data stored at locations corresponding to said addresses in said main memory;

wherein instructions stored in said main memory are accessed and executed by said microprocessor, and at least some instructions for said microprocessor include bit information which designates whether said instruction calls or does not call for accessing a data area in said main memory which is repeatedly accessed at a high probability rate;

wherein said microprocessor further includes
(1) first means for detecting said bit information in an instruction; and
(2) second means coupled to said cache memory for accessing said cache memory and reading out said copy of said part of said data from said cache memory instead of accessing said main memory for said data in response to a detection result of said first means indicating that said bit information designates an instruction which calls for accessing said data area; and wherein said second means accesses said main memory and reads out data from said main memory without regard to said cache memory in response to another detection result of said first means indicating that said bit information designates an instruction which does not call for accessing said data area.

9. A microprocessor according to claim 8, wherein said cache memory is formed on a single chip of said microprocessor.

* * * * *